Dec. 23, 1930.  W. B. STOUT  1,785,879
AIRPLANE CONTROL
Original Filed July 11, 1925    3 Sheets-Sheet 1
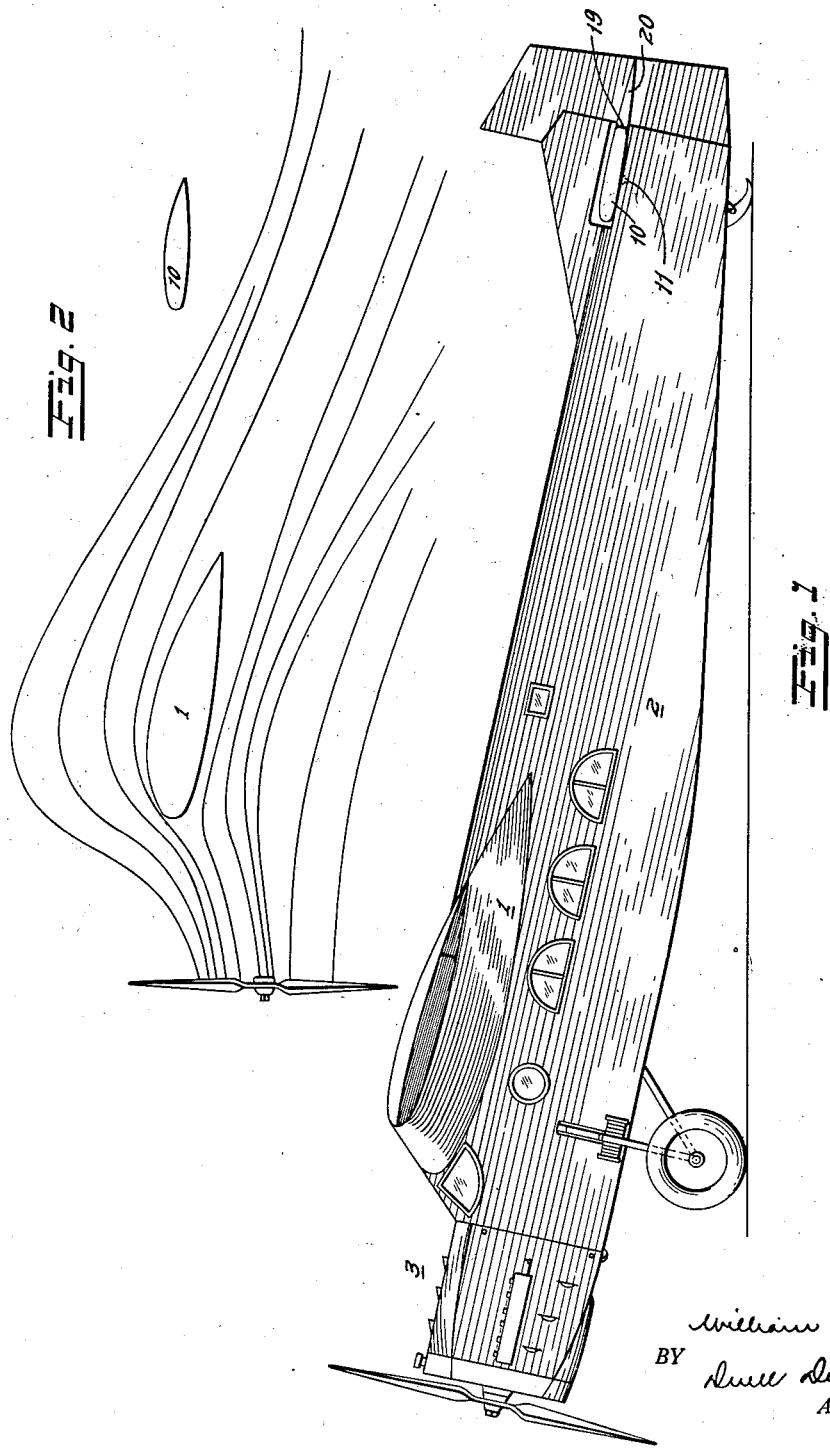
INVENTOR.
William B. Stout
BY
ATTORNEYS.

Dec. 23, 1930.  W. B. STOUT  1,785,879
AIRPLANE CONTROL
Original Filed July 11, 1925   3 Sheets-Sheet 2
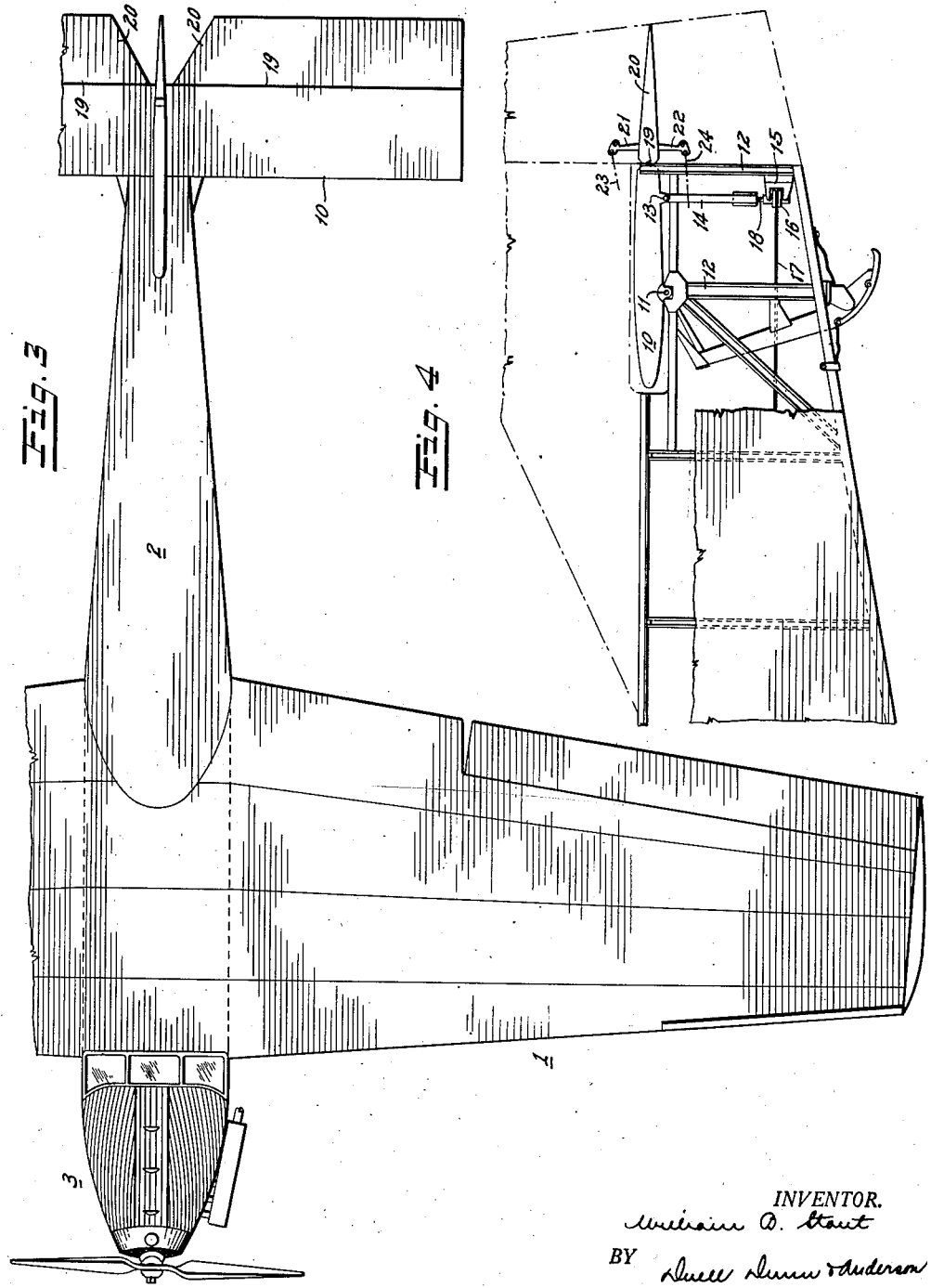
INVENTOR.
William B. Stout
BY Duell Dunn & Anderson
ATTORNEYS.

Dec. 23, 1930.   W. B. STOUT   1,785,879
AIRPLANE CONTROL
Original Filed July 11, 1925   3 Sheets-Sheet 3
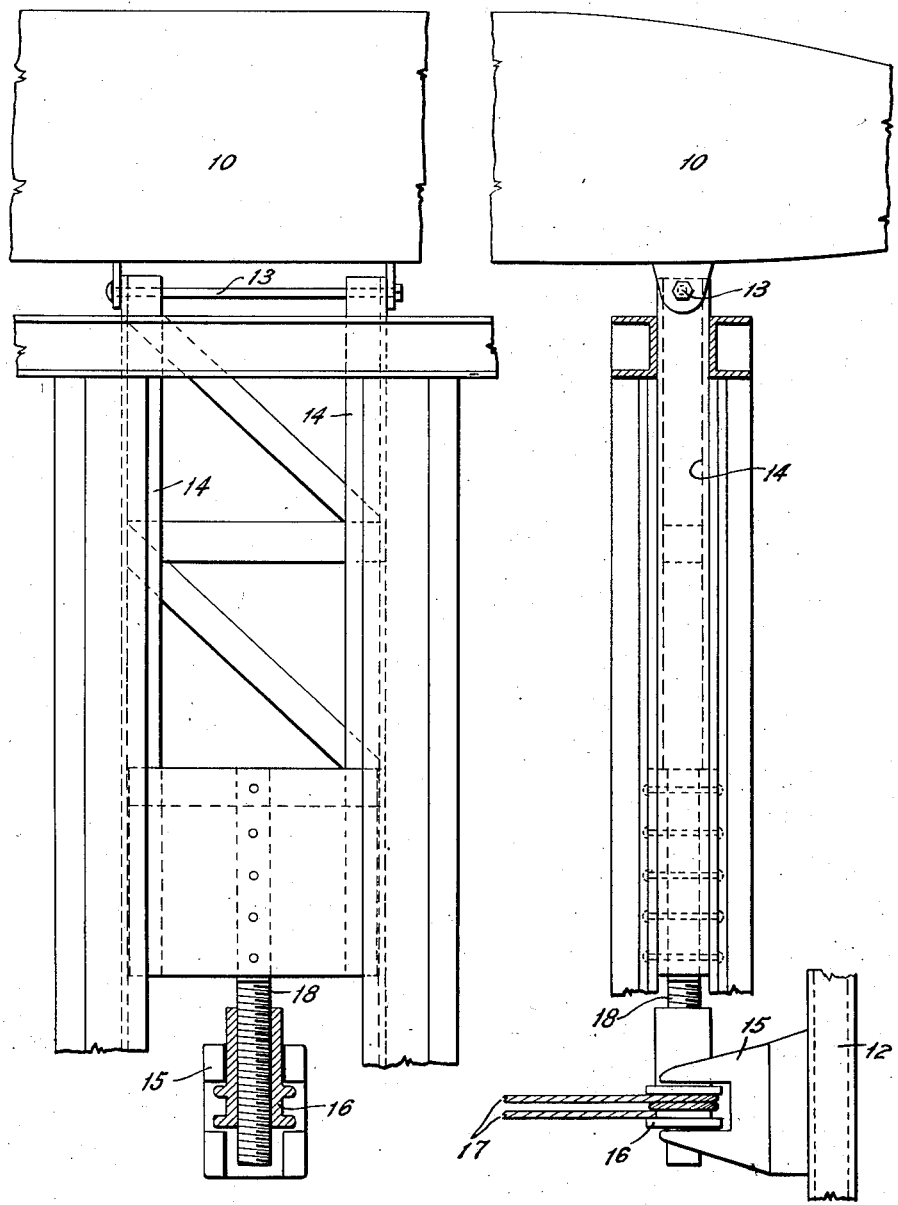
INVENTOR.
william B. Stout
BY
ATTORNEYS.

Patented Dec. 23, 1930

1,785,879

UNITED STATES PATENT OFFICE

WILLIAM B. STOUT, OF DETROIT, MICHIGAN, ASSIGNOR TO FORD MOTOR COMPANY, OF HIGHLAND PARK, MICHIGAN

AIRPLANE CONTROL

Original application filed July 11, 1925, Serial No. 42,944. Divided and this application filed October 5, 1926. Serial No. 139,591.

This invention relates to airplanes and more particularly to the control mechanism and its relation to other portions of the plane.

This application is a division of my co-pending application, Serial No. 42,944, filed July 11, 1925.

In the construction of airplanes as carried out heretofore, it has been customary to make the parts so light and of such a character as to require external bracing and strengthening members, usually in the form of wires, struts, and the like in order to give the various parts of the plane the strength necessary to withstand the stresses. In accordance with my invention, it has been discovered that the main essential portions of the plane such as the wing and fuselage, may without material increase in their resistance, and without a commensurate increase in weight, be made of such form as to be internally self-supporting so that the external bracing and struts are not required. In this manner the parasite resistance resulting from such bracing and struts is completely avoided and the relation of useful lift to drift is materially increased. Furthermore, the air currents passing over the machine are cause to move with as little parasitic disturbance as possible. Such a machine is described in my co-pending application aforesaid.

In carrying out the principles outlined, that is, in causing the supporting elements to move with the minimum of parasitic air disturbance I have found that the efficiency of the stabilizing mechanism may be very greatly increased by so arranging it with reference to the main supporting airfoil, that it is out of the slip stream.

It has been heretofore customary to mount upon the empennage a fixed horizontal plane designed to maintain the stability of the plane during average conditions and to employ also a movable plane which may be used to elevate or depress the angle of attack of the plane by lowering or raising the empennage. Such a system, however, is not satisfactory since the average conditions of use to which the stabilizer is adjusted seldom obtain. It is, therefore, necessary with such a system to employ the elevator for a large part of the vertical manipulation of the plane.

In accordance with my invention this procedure is overcome by mounting the stabilizer upon a pivot whereby its angle of attack can be altered at will. At the same time the elevator may be employed for more delicate control. In order, however, to minimize air disturbance caused by the use of both stabilizer and elevator when both of these parts are movable, the elevator is preferably hinged to the rear edge of the stabilizer.

It is an object of this invention, therefore, to provide an airplane having an improved form of mechanism for effecting fore and aft stabilization.

It is a further object to arrange such mechanism in a manner to require a minimum continuous operation of the elevator mechanism.

It is a further object to accomplish these results with the minimum of disturbance, to the air stream, and consequently with a minimum drift resistance.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claim.

For a fuller understanding of the nature and objects of the invention reference should be had to the following detailed description taken in connection with the accompanying drawing, in which:

Fig. 1 is a side elevation of a plane made in accordance with this invention. Fig. 2 is a diagrammatic view showing the relation of the stabilizer to the slip stream from the front plane. Fig. 3 is a top plan view, parts being broken away at one side for convenience of illustration. Fig. 4 is an elevation of the stabilizer support and control mechanism, and Figs. 5 and 6 are details of the mechanism shown in Fig. 4.

In the drawings, the numeral 1 designates in general the wing of the airplane, the numeral 2 the body of the fuselage and the numeral 3 the power plant thereof. These parts are preferably arranged as separable, self-supporting units, each having its own independent supporting framework, which frameworks may be suitably attached together to form the complete machine. These frameworks and coverings are so designed that when the frameworks are assembled the coverings merge into each other in stream line effect, all of which will be more clear from the aforesaid co-pending application. These features form no part of the present invention.

The wing section is preferably a unitary structural element from one wing tip to the other, of such construction that the topmost points of the various wing sections forming a continuous horizontal line from one wing tip to the other, while the incident and trailing edges of the wing taper toward each other toward the wing tips, all cross-sections of the wing being similar. In this manner the effective wing presents a dihedral angle affording lateral stability.

The main body of the fuselage preferably has two supporting frameworks, one at the front as had been previously described in the aforesaid co-pending application, and to which the wings and power plant are attached, and the other in the rear as illustrated in Fig. 4 for supporting and controlling the stabilizer and elevator. These may be connected together by a truss work comprising horizontal longérons, combined in structural association with the covering itself. The covering of the fuselage is preferably of an aluminum alloy in corrugated sheet form, the corrugations running from front to back, and where such a covering is employed it will frequently be found that it in itself will furnish a material portion of the strength required to connect the empennage frame with the body frame. The power plant construction is preferably in the form also of a separable self-sustaining unit including the engine, the propeller, and all the auxiliary apparatus, excepting the fuel tank, so that the entire operating mechanism may be assembled and disconnected from the airplane and in case of damage it may be possible to remove the power plant and substitute another without otherwise altering the machine.

All of the above features are described in greater detail in the aforesaid co-pending application.

They are here described thus generally in order that the drawings herein may be better understood and the relation of the steering mechanism to the body of the plane may be made clear.

In accordance with this invention, there is provided in the empennage a stabilizer 10 pivoted as at 11 to the rear framework 12. This pivot 11 is preferably situated directly beneath the center support of the elevator 10. This elevator is in the form of an airfoil plane which with the elevator to be described is of stream line characteristics. By reason of the fact that the pivot is below the plane, an airfoil may be employed in which the center of support shifts slightly to the rear as the plane tilts forward. In this manner the center of support will remain substantially vertically over the pivot. Connected to the elevator 10 at a point in the rear of the pivot 11 is a pivot 13 connected with a link 14 which may be raised and lowered. This link preferably takes the form of spaced elements slidable vertically within the frame and which elements may have cross braces extending between them. The pivot member 13 extends between these elements adjacent their upper ends and their lower ends are connected by a transverse member from which a screw 18 extends. A nut 16 is rotatably mounted upon this screw and is maintained against axial shifting by a bracket 15 and the rotation of the nut is governed in any desirable manner as, for example, by a cable 17. Thus, when the cable 17 is operated the nut 16 rotates upon the screw 18 to raise or lower the link 14, and hence to alter the angle of the stabilizer 10.

Pivoted to the rear edge of the stabilizer 10, as shown at 19, are elevators 20 controlled by arms 21, 22, moved by cables 23 and 24. These cables preferably pass through, or close to, the axis of the pivot 11, whereby the tilting of the wing 10 does not change the relative relation between the elevator 20 and the stabilizer.

The wing 1 and the stabilizer 10 are so arranged that the slip stream from the wing follows below the stabilizer so that the stabilizer operates in undisturbed air as will be clearly seen from Fig. 2. This results in the fact not only that a maximum effect is produced by the minimum size of stabilizer, but also that the effect of the stabilizer on the operation of the machine is steadier and more uniform. Where the disturbed currents, flowing from the wing strike the stabilizer, it results in uncertainties of control since slight or sudden changes in the wind currents encountered or in the direction of the machine will vary the direction of the currents striking the stabilizer and produce unforeseen and perhaps even disastrous results.

In operation it will be evident that the normal stabilizing position of the stabilizer may be altered at will by the pilot and hence it may be placed in a position to maintain a given angle of ascent or a given angle of descent by the stabilizer. The result of such action is that the elevator may, if desired, be kept at all times normally on its neutral position, and hence more sensitive to control.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent, is:

An airplane including a fuselage, a stabilizer, a frame forming a part of the former, a link member slidably mounted in said frame, said link member comprising a pair of spaced elements, a connecting member between the lower ends thereof, a screw extending from said connecting member, a nut upon said screw, means for maintaining said nut against shifting, means for turning said nut, a pivot member extending between the upper ends of said elements, said stabilizer being secured to said pivot element and a further pivot between said stabilizer and fuselage.

In testimony whereof I affix my signature.

WM. B. STOUT.